United States Patent
Deng et al.

(10) Patent No.: US 9,838,509 B2
(45) Date of Patent: Dec. 5, 2017

(54) DATA PROCESSING METHOD AND APPARATUS

(71) Applicant: Huawei Device Co., Ltd., Shenzhen (CN)

(72) Inventors: Yu Deng, Shanghai (CN); Yue Zhang, Shanghai (CN); Yu Peng, Shanghai (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/906,487

(22) PCT Filed: Aug. 21, 2014

(86) PCT No.: PCT/CN2014/084894
§ 371 (c)(1),
(2) Date: Jan. 20, 2016

(87) PCT Pub. No.: WO2015/039519
PCT Pub. Date: Mar. 26, 2015

(65) Prior Publication Data
US 2016/0156746 A1 Jun. 2, 2016

(30) Foreign Application Priority Data
Sep. 17, 2013 (CN) .......................... 2013 1 0426077

(51) Int. Cl.
*H04L 1/00* (2006.01)
*H04L 29/06* (2006.01)
(Continued)

(52) U.S. Cl.
CPC ............ *H04L 69/08* (2013.01); *G06F 1/3203* (2013.01); *G06F 1/3293* (2013.01); *H04L 43/10* (2013.01);
(Continued)

(58) Field of Classification Search
CPC ........ H04L 69/08; H04L 67/04; H04L 69/163
(Continued)

(56) References Cited

U.S. PATENT DOCUMENTS

2006/0233116 A1* 10/2006 Kyusojin ............ H04L 43/0864
370/252
2007/0162777 A1 7/2007 Imao
(Continued)

FOREIGN PATENT DOCUMENTS

CN 101416445 A 4/2009
CN 101686195 A 3/2010
(Continued)

*Primary Examiner* — Iqbal Zaidi
(74) *Attorney, Agent, or Firm* — Leydig, Voit & Mayer, Ltd.

(57) ABSTRACT

Embodiments of the present invention provide a data processing method and apparatus. The method includes: receiving a data packet sent by a server, and acquiring a type of the data packet; determining whether the type of the data packet is consistent with a type of a data packet processed by using a preset processing rule or a type of a protocol in a preset TCP/IP protocol stack to obtain a determining result; and if the type of the data packet is consistent with the type of the data packet processed by using the preset processing rule or the type of the protocol in the preset TCP/IP protocol stack, performing processing on the data packet according to the protocol in the preset TCP/IP protocol stack or the preset processing rule.

9 Claims, 5 Drawing Sheets

(51) Int. Cl.
  *H04L 29/08* (2006.01)
  *H04L 12/26* (2006.01)
  *G06F 1/32* (2006.01)
  *H04W 52/02* (2009.01)

(52) U.S. Cl.
  CPC .............. *H04L 67/04* (2013.01); *H04L 67/26* (2013.01); *H04L 69/163* (2013.01); *H04L 67/145* (2013.01); *H04W 52/0229* (2013.01); *Y02B 60/46* (2013.01); *Y02B 60/50* (2013.01)

(58) Field of Classification Search
  USPC .................................................. 370/252–503
  See application file for complete search history.

(56) References Cited

U.S. PATENT DOCUMENTS

| | | |
|---|---|---|
| 2007/0237104 A1 | 10/2007 | Alon et al. |
| 2009/0034416 A1* | 2/2009 | Baron ................. H04L 12/4633 370/235 |
| 2010/0188685 A1 | 7/2010 | Furukawa |
| 2011/0019600 A1 | 1/2011 | Ping et al. |
| 2011/0194474 A1 | 8/2011 | Kim et al. |
| 2012/0188928 A1 | 7/2012 | Wang et al. |
| 2012/0269193 A1 | 10/2012 | Guo et al. |
| 2012/0278641 A1 | 11/2012 | Papakipos et al. |
| 2013/0067060 A1 | 3/2013 | Thaler et al. |
| 2014/0304425 A1* | 10/2014 | Taneja ................... H04L 47/12 709/235 |

FOREIGN PATENT DOCUMENTS

| | | |
|---|---|---|
| CN | 101963902 A | 2/2011 |
| CN | 102036349 A | 4/2011 |
| CN | 103051463 A | 4/2013 |
| JP | 2007183797 A | 7/2007 |
| JP | 2010176220 A | 8/2010 |
| JP | 2011060028 A | 3/2011 |
| JP | 2012217051 A | 11/2012 |
| JP | 2013157751 A | 8/2013 |
| WO | WO 2012163428 A1 | 12/2012 |

* cited by examiner

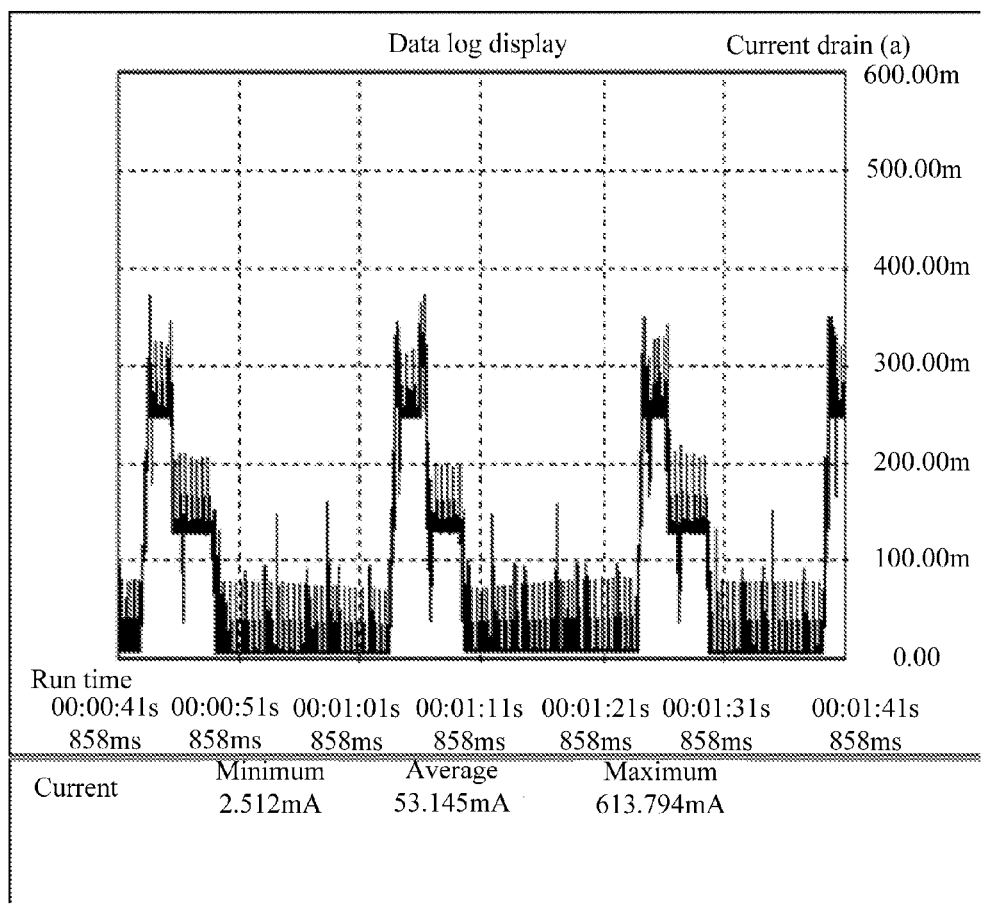
FIG. 6-a

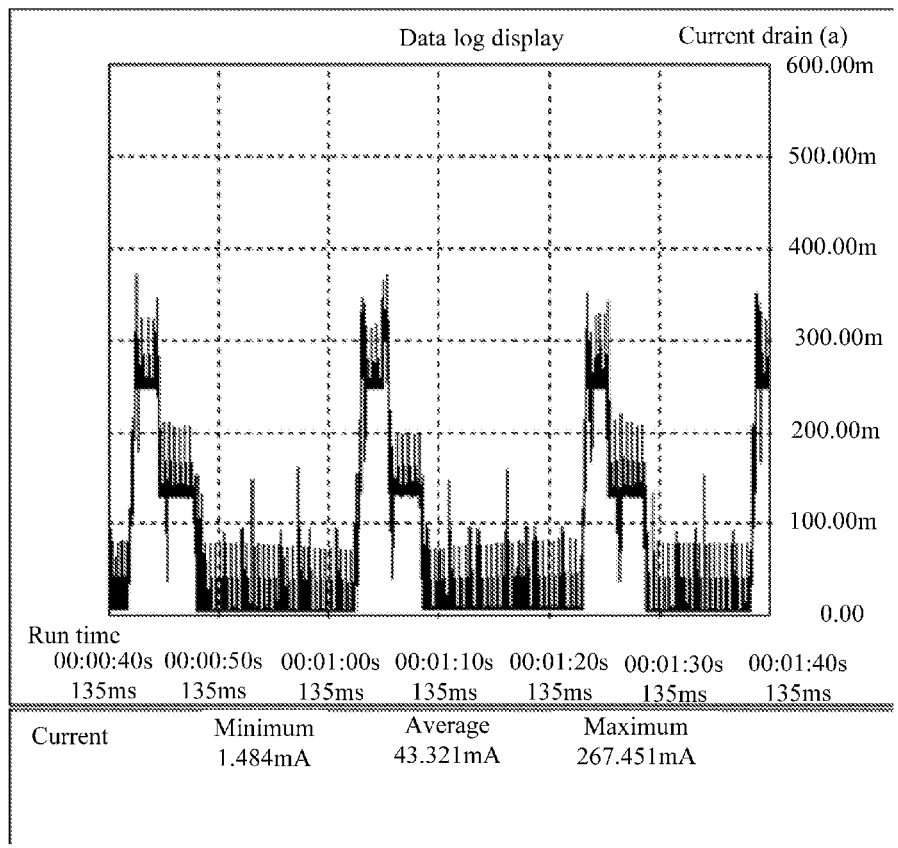
FIG. 6-b

DATA PROCESSING METHOD AND APPARATUS

This application is a U.S. National Phase application under 35 U.S.C. §371 of International Application No. PCT/CN2014/084894, filed on Aug. 21, 2014, which claims priority to Chinese Patent Application No. 201310426077.0, filed with the Chinese Patent Office on Sep. 17, 2013 and entitled "DATA PROCESSING METHOD AND APPARATUS". Both of these applications are incorporated herein by reference in their entireties.

TECHNICAL FIELD

The present invention relates to the field of terminal application technologies, and in particular, to a data processing method and apparatus.

BACKGROUND

Currently, a mobile device uses an Internet communication mode that is based on an application processor (Application Processor, AP for short) and a modem (Modem). In a process of data packet transmission, the AP is responsible for packetizing data and sending packetized data to the Modem and parsing a data packet received by the Modem, and the Modem is responsible for sending a data packet sent by the AP to a network and reporting a data packet received from the network to the AP. However, in a use process, a quantity of electricity of the mobile device is limited. When data packets are frequently transmitted, power consumption of the mobile device is large.

To reduce power consumption of a mobile device, the following solution is provided in the prior art: A firewall is set up in an AP, where the firewall is used to block a junk data packet received by a Modem. When receiving a data packet, the Modem wakens the AP and the AP performs detection on the data packet according to a firewall policy. If the data packet is a junk data packet, the AP discards the data packet, thereby reducing a workload of the AP for parsing the data packet.

In a process of implementing the foregoing data processing, the inventor finds that at least the following problem exists in the prior art: In the prior art, receiving of a junk data packet can be avoided by an application program on an AP side, but an overall effect of reducing energy consumption of an AP and a Modem is not significant.

SUMMARY

A data processing method and apparatus provided in the present invention can resolve a problem that overall energy consumption of an AP and a Modem in a mobile device cannot be significantly reduced.

According to a first aspect, the present invention provides a data processing method, where the method is applied to a modem Modem, and the method includes:

receiving a data packet sent by a server, and acquiring a type of the data packet;

determining whether the type of the data packet is consistent with a type of a data packet processed by using a preset processing rule or a type of a protocol in a preset TCP/IP protocol stack to obtain a determining result, where the preset TCP/IP protocol stack includes a transport layer protocol suite and/or a network layer protocol suite in a TCP/IP protocol family, and the data packet processed by using the preset processing rule is a status data packet, where the status data packet is used to indicate an on-line status of a terminal;

when the type of the data packet is consistent with the type of the data packet processed by using the preset processing rule, performing processing on the data packet according to the preset processing rule; and when the type of the data packet is consistent with the type of the protocol in the preset TCP/IP protocol stack, performing processing on the data packet according to the protocol in the preset TCP/IP protocol stack.

In a first possible implementation manner of the first aspect, the method further includes: the preset TCP/IP stack includes:

a preset network layer protocol suite, where the network layer protocol suite includes at least one of the following protocols: ICMP and IGMP; and/or a preset transport layer protocol suite, where the transport layer protocol suite includes at least one of the following protocols: TCP and UDP.

In the first possible implementation manner of the first aspect, a second possible implementation manner of the first aspect is further provided. In the second possible implementation manner of the first aspect, the performing processing on the data packet according to the protocol in the TCP/IP protocol stack includes:

when the data packet is a Ping data packet, acquiring a reachability status of a device queried by using the Ping data packet; and sending the reachability status of the device to the server.

In the first possible implementation manner of the first aspect, a third possible implementation manner of the first aspect is further provided. In the third possible implementation manner of the first aspect, the performing processing on the data packet according to the protocol in the TCP/IP protocol stack includes:

when the data packet is an IGMP data packet, if an AP is already in a sleep state, discarding the IGMP data packet.

In the first possible implementation manner of the first aspect, a fourth possible implementation manner of the first aspect is further provided. In the fourth possible implementation manner of the first aspect, before the performing processing on the data packet according to the protocol in the TCP/IP protocol stack, the method further includes:

receiving a port reachability information list sent by an AP, where the port reachability information list includes at least one port number, and the port number is an identification number of an activated port; and the performing processing on the data packet according to the protocol in the TCP/IP protocol stack includes:

when the data packet is a TCP data packet or a UDP data packet, if a port number included in the TCP data packet or the UDP data packet is not included in the port reachability information list, discarding the TCP data packet or UDP data.

In the first possible implementation manner of the first aspect, a fifth possible implementation manner of the first aspect is further provided. In the fifth possible implementation manner of the first aspect, before the performing processing on the data packet according to the preset processing rule, the method further includes:

receiving the preset processing rule sent by an AP, where the status data packet is a heartbeat data packet or a Push data packet; and the performing processing on the data packet according to the preset processing rule includes:

if the push Push data packet sent by the server is received, sending a response data packet to the server according to the Push data packet, where the response data packet is used for the server to learn that the mobile device is in an on-line state.

In the first aspect or in the first to fifth possible implementation manners of the first aspect, a sixth possible implementation manner of the first aspect is further provided. In the sixth possible implementation manner of the first aspect, in a process of sending data to the server, the method further includes:

if a network signal strength is less than a preset strength value, and the received data packet is resending failure information sent by the server, cancelling data packet sending within preset waiting duration.

According to a second aspect, the present invention further provides a data processing method, where the apparatus is applied to a modem Modem, and the apparatus includes:

a receiver of the modem, configured to receive a data packet sent by a server; and a processor of the modem, configured to acquire a type of the data packet;

determine whether the type of the data packet received by the receiver of the modem is consistent with a type of a data packet processed by using a preset processing rule or a type of a protocol in a preset TCP/IP protocol stack to obtain a determining result, where the preset TCP/IP protocol stack includes a transport layer protocol suite and/or a network layer protocol suite in a TCP/IP protocol family, and the data packet processed by using the preset processing rule is a status data packet, where the status data packet is used to indicate an on-line status of a terminal;

when the type of the data packet is consistent with the type of the data packet processed by using the preset processing rule, perform processing on the data packet according to the preset processing rule; and when the type of the data packet is consistent with the type of the protocol in the preset TCP/IP protocol stack, perform processing on the data packet according to the protocol in the preset TCP/IP protocol stack.

In a first possible implementation manner of the second aspect, the processor of the modem is further configured to preset the network layer protocol suite, where the network layer protocol suite includes at least one of the following protocols: ICMP and IGMP; and/or preset the transport layer protocol suite, where the transport layer protocol suite includes at least one of the following protocols: TCP and UDP.

In the first possible implementation manner of the second aspect, a second possible implementation manner of the second aspect is further provided. In the second possible implementation manner of the first aspect, that the processor of the modem is configured to perform processing on the data packet according to the protocol in the TCP/IP protocol stack is specifically that:

the processor of the modem is configured to: when the data packet is a Ping data packet, acquire a reachability status of a device queried by using the Ping data packet, where the apparatus further includes a transmitter of the modem, configured to send the reachability status of the device to the server.

In the first possible implementation manner of the second aspect, a third possible implementation manner of the second aspect is further provided. In the third possible implementation manner of the second aspect, that the processor of the modem is configured to perform processing on the data packet according to the protocol in the TCP/IP protocol stack is specifically that:

the processor of the modem is configured to: when the data packet is an IGMP data packet, if an AP is already in a sleep state, discard the IGMP data packet.

In the first possible implementation manner of the second aspect, a fourth possible implementation manner of the second aspect is further provided. In the fourth possible implementation manner of the second aspect, the receiver of the modem is further configured to receive a port reachability information list sent by an AP, where the port reachability information list includes at least one port number, and the port number is an identification number of an activated port; and that the processor of the modem is configured to perform processing on the data packet according to the protocol in the TCP/IP protocol stack is specifically that:

when the data packet is a TCP data packet or a UDP data packet, if a port number included in the TCP data packet or the UDP data packet is not included in the port reachability information list, the TCP data packet or UDP data is discarded.

In the first possible implementation manner of the second aspect, a fifth possible implementation manner of the second aspect is further provided. In the fifth possible implementation manner of the second aspect, the receiver of the modem further includes: receiving the preset processing rule sent by an AP, where the status data packet is a heartbeat data packet or a Push data packet; and that the processor of the modem is configured to perform processing on the data packet according to the preset processing rule is specifically that:

the processor of the modem is configured to: when the receiver of the modem receives the push Push data packet sent by the server, control, according to the Push data packet, a transmitter of the modem to send a response data packet to the server, where the response data packet is used for the server to learn that the mobile device is in an on-line state.

In the second aspect or in the first to fifth possible implementation manners of the second aspect, a sixth possible implementation manner of the second aspect is further provided. In the sixth possible implementation manner of the second aspect, the processor of the modem is further configured to: when a network signal strength is less than a preset strength value, and the receiver of the modem receives resending failure information sent by the server, control the transmitter of the modem to cancel data packet sending within preset waiting duration.

According to the data processing method and apparatus provided in the present invention, a Modem can acquire a type of a received data packet; determine whether the type of the data packet is consistent with a type of a data packet processed by using a preset processing rule or a type of a protocol in a preset TCP/IP protocol stack; and if the type of the data packet is consistent with the type of the data packet processed by using the preset processing rule or the type of the protocol in the preset TCP/IP protocol stack, perform processing on the data packet according to the protocol in the TCP/IP protocol stack or the preset processing rule. In the prior art, after receiving a data packet sent by a server, the Modem wakens an AP, and sends all received data packets to the AP for processing. The AP is in a wakened state (a high power consumption state) for a long period of time, leading to large power consumption of a mobile device. In the present invention, the preset TCP/IP protocol stack or the preset processing rule is added to a memory of the Modem, which enables the Modem to have a capability of processing some data packets. When the type of the data packet is consistent with the type of the protocol in the preset TCP/IP protocol stack or the preset processing rule, the AP does not need to be wakened, and the Modem can replace the AP to perform processing on the data packet. In other words, only when the data packet cannot be processed by using the type of the protocol in the preset TCP/IP protocol stack or the preset processing rule stored in the Modem, the AP is wakened to perform processing on the data packet. When a same operation is completed, power consumption of the Modem is less than power consumption of the AP; therefore, the technical solution of the present invention can prolong time during which the AP stays in a sleep state and reduce power consumption of the AP, thereby reducing power consumption of the mobile device.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

FIG. 6-a is a diagram of energy consumption when a Ping data packet is processed according to the prior art; and FIG. 6-b is a diagram of energy consumption when a Ping data packet is processed according to an embodiment of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
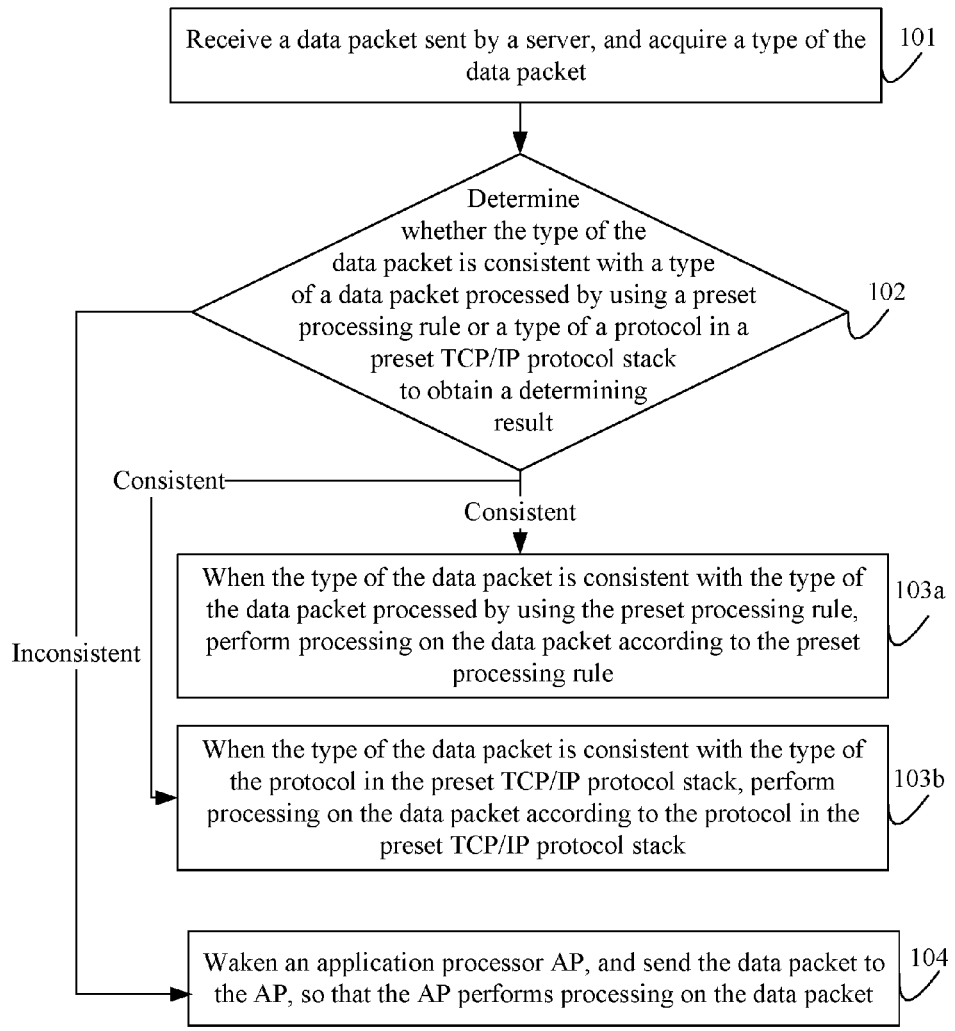
FIG. 1 is a flowchart of a first data processing method according to an embodiment of the present invention.

An embodiment of the present invention provides a data processing method. As shown in FIG. 1, the method is applied to a modem Modem, and the method includes:

Step 101: Receive a data packet sent by a server, and acquire a type of the data packet.

A flag bit identifying the type of the data packet is found from the data packet, and the type of the data packet is determined according to the flag bit. The modem is a wireless modem. When the data packet sent by the server is received, a pulse signal that may be propagated on an air interface network is converted, by using a demodulator, into a digital signal that can be identified by a mobile terminal. The type of the data packet is any one of the following data packets: a Ping data packet that checks whether a network is connected, an address resolution protocol (Address Resolution Protocol, ARP) data packet, an Internet Control Message Protocol (Internet Control Message Protocol, ICMP) data packet, an Internet Group Management Protocol (Internet Group Management Protocol, IGMP) data packet, a Transmission Control Protocol (Transmission Control Protocol, TCP) data packet, a User Datagram Protocol (User Datagram Protocol, UDP) data packet, and the like.

Step 102: Determine whether the type of the data packet is consistent with a type of a data packet processed by using a preset processing rule or a type of a protocol in a preset TCP/IP protocol stack to obtain a determining result.

The TCP/IP protocol stack includes a network layer protocol suite and/or a transport layer protocol suite, and the data packet processed by using the preset processing rule is a status data packet. The network layer protocol suite is ICMP and/or IGMP, and the transport layer protocol suite is TCP and/or UDP. The status data packet is used to indicate an on-line status of the terminal. For example, when a push Push data packet sent by the server is received, a response data packet (which is used to indicate the on-line status of the terminal) is returned. Protocols in the TCP/IP protocol stack and the preset processing rule are separately used to process different types of data packets. If the type of the data packet is consistent with the type of the protocol in the preset TCP/IP protocol stack or the type of the data packet processed by using the preset processing rule, it is determined that the preset TCP/IP protocol stack or the preset processing rule can be used to process a data packet of this type; otherwise, it is determined that the preset TCP/IP protocol stack or the preset processing rule cannot be used to process a data packet of this type. Consistence means that the type of the data packet is the same as one or more types of the protocol, or that the type of the data packet is one or more types of the data packet processed by using the preset processing rule. The network layer protocol suite includes at least one of the following protocols: ICMP and IGMP. The transport layer protocol suite includes at least one of the following protocols: TCP and UDP.

Step 103a: When the type of the data packet is consistent with the type of the data packet processed by using the preset processing rule, perform processing on the data packet according to the preset processing rule.

When the type of the data packet is consistent with the type of the protocol in the preset TCP/IP protocol stack, processing is performed on the data packet according to a stipulation in the protocol in the preset TCP/IP protocol stack. The protocol in the TCP/IP protocol stack, for example, a network layer protocol, may be used to process an ICMP data packet; and a transport layer protocol, may be used to process a Ping data packet, a TCP data packet, and a UDP data packet.

Step 103b: When the type of the data packet is consistent with the type of the protocol in the preset TCP/IP protocol stack, perform processing on the data packet according to the protocol in the preset TCP/IP protocol stack.

When the type of the data packet is consistent with the type of the data packet processed by using the preset processing rule, processing is performed on the data packet according to the preset processing rule. The performing processing on the data packet according to the preset processing rule includes: regularly receiving a status data packet sent by a network side server, and replying according to the status data packet; or regularly sending a status data packet to a network side server. For example, if the preset processing rule stipulates a timing feedback mechanism, the timing feedback mechanism is to regularly send a status data packet to the network side server at an interval of preset duration, so that the network side server acquires the on-line status of the terminal, where the status data packet is used to indicate the on-line status of the terminal.

Step 104: If the type of the data packet is inconsistent with the type of the data packet processed by using the preset processing rule or the type of the protocol in the preset TCP/IP protocol stack, waken an application processor AP, and send the data packet to the AP, so that the AP performs processing on the data packet.

When the type of the received data packet is inconsistent with the type of the preset TCP/IP protocol stack or the type of the data packet processed by using the preset processing rule, the application processor (Application Processor, AP for short) is wakened. After being wakened, the AP may perform processing on the data packet.

According to the data processing method provided in this embodiment of the present invention, a type of a received data packet can be acquired; whether the type of the data packet is consistent with a type of a protocol in a preset TCP/IP protocol stack or a type of a data packet processed by using a preset processing rule is determined; and if the type of the data packet is consistent with the type of the protocol in the preset TCP/IP protocol stack or the type of the data packet processed by using the preset processing rule, processing is performed on the data packet according to the TCP/IP protocol stack or the preset processing rule; otherwise, an AP is wakened. In the prior art, after receiving the data packet, a Modem wakens the AP, and sends all received data packets to the AP for processing. The AP is in a wakened state (a high power consumption state) for a long period of time, which leads to large power consumption of a mobile device. In this embodiment of the present invention, the protocol in the preset TCP/IP protocol stack or the preset processing rule is added to the Modem, which enables the Modem to have a capability of processing some data packets. When the type of the data packet is consistent with the type of the protocol in the preset TCP/IP protocol stack or the preset processing rule, the AP does not need to be wakened, and the Modem can replace the AP to perform processing on the data packet. In other words, only when the data packet cannot be processed by using the protocol in the preset TCP/IP protocol stack or the preset processing rule stored in the Modem, the AP is wakened to perform processing on the data packet. When a same operation is completed, power consumption of the Modem is less than power consumption of the AP; therefore, time during which the AP stays in a sleep state can be prolonged, and power consumption of the AP can be reduced, thereby reducing power consumption of the mobile device.

An embodiment of the present invention further provides a data processing method as a further description of the method shown in FIG. 1. Optionally, the preset TCP/IP protocol stack includes:

a preset network layer protocol suite, where the network layer protocol suite includes at least one of the following protocols: ICMP and IGMP; and/or a preset transport layer protocol suite, where the transport layer protocol suite includes at least one of the following protocols: TCP and UDP.

Figure 2:
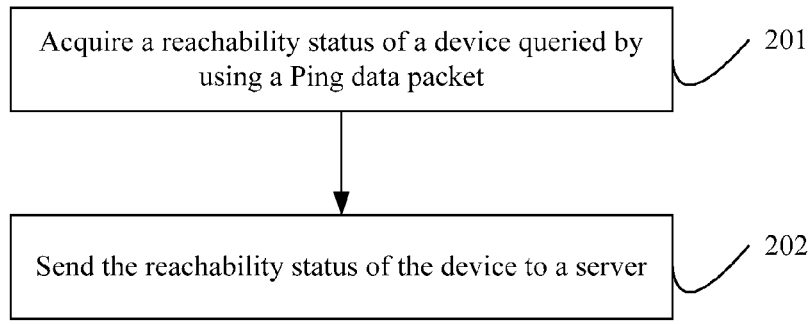
FIG. 2 is a flowchart of a second data processing method according to an embodiment of the present invention.

When the data packet is a Ping data packet, as shown in FIG. 2, the performing processing on the data packet according to the protocol in the TCP/IP protocol stack includes:

Step 201: Acquire a reachability status of a device queried by using the Ping data packet.

The Ping data packet is used to detect whether there is a device. When a Ping command data packet is received, the Ping data packet is parsed according to ICMP, so as to obtain a network address of the detected device. Then a locally reserved routing information table is searched to check whether the network address exists.

Step 202: Send the reachability status of the device to a server.

The reachability status involves a reachable state or an unreachable state. If the network address is in the routing information table, the device is reachable, and information indicating that the device is reachable is sent to the server. Otherwise, if the network address is not in the routing information table, the device is unreachable, and information indicating that the device is unreachable is sent to the server.

Optionally, when the data packet is an IGMP data packet, the performing processing on the data packet according to the protocol in the TCP/IP protocol stack includes:

if the AP is already in a sleep state, discarding the IGMP data packet.

The IGMP data packet is a broadcast data packet, and content of the IGMP data packet is information about a multicast group in which the terminal is located. If the AP is already in the sleep state at this moment, the IGMP data packet is directly discarded, thereby reducing a quantity of times that the AP is wakened.

Further, if the AP is already in the sleep state and a screen is in a low power state, the IGMP data packet is discarded.

The low power state of the screen includes: a screen locking state or a screen-off state.

In this embodiment, by directly discarding the IGMP data packet, the quantity of times that the AP is wakened can be reduced.

Figure 3:
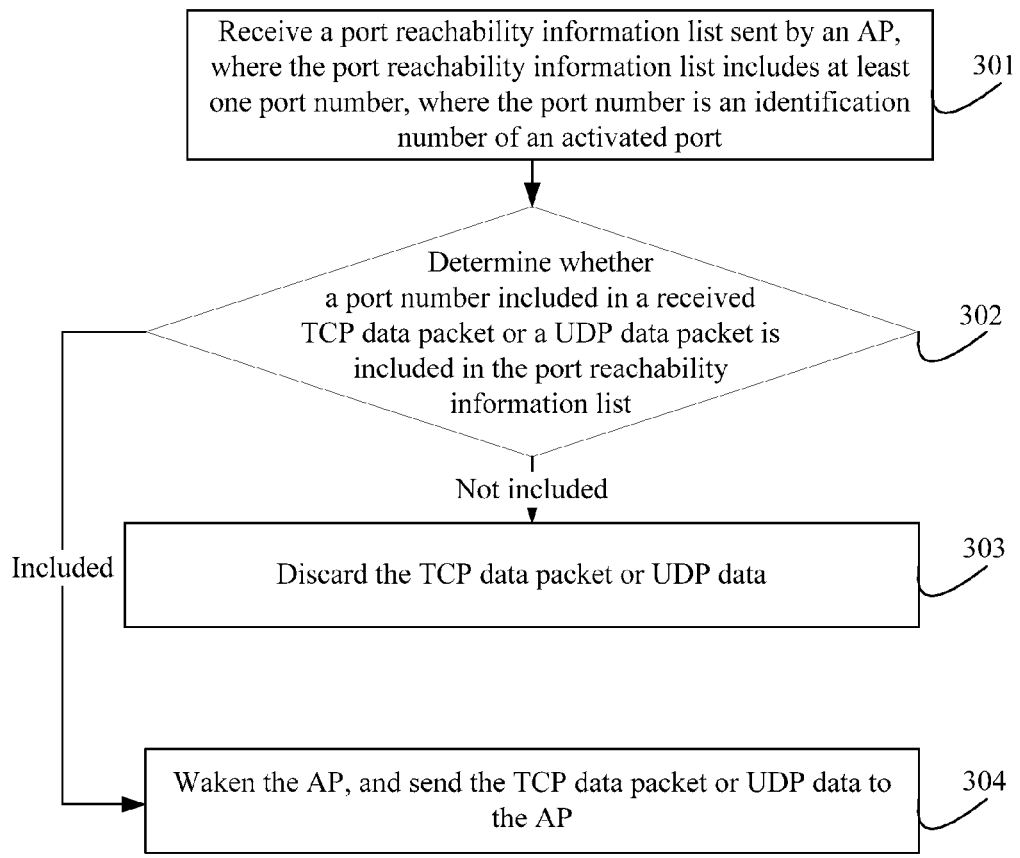
FIG. 3 is a flowchart of a third data processing method according to an embodiment of the present invention.

Optionally, as shown in FIG. 3, before the performing processing on the data packet according to the protocol in the TCP/IP protocol stack, the method further includes:

Step 301: Receive a port reachability information list sent by an AP, where the port reachability information list includes at least one port number, and the port number is an identification number of an activated port.

Step 302: Determine whether a port number included in a received TCP data packet or UDP data packet is included in the port reachability information list.

When the data packet is a TCP data packet or a UDP data packet, the performing processing on the data packet according to the protocol in the TCP/IP protocol stack may further include:

Step 303: If the port number included in the TCP data packet or the UDP data packet is not included in the port reachability information list, discard the TCP data packet or UDP data.

Step 304: If the port number included in the TCP data packet or the UDP data packet is included in the port reachability information list, waken the AP, and send the TCP data packet or UDP data to the AP.

Each application program receives a data packet by using an exclusive port. The terminal stores, in a local memory, a list recording all activated ports, that is, the port reachability information list. The list is sent to the Modem by the AP before the AP enters the sleep state. When the Modem receives the data packet, if a type of the data packet is the TCP data packet or the UDP data packet, processing is performed on the data packet according to step 303 to step 304. If the port number included in the TCP data packet or the UDP data packet is not included in the port reachability information list, it indicates that the terminal cannot perform processing on the data packet. In this case, the AP does not need to be wakened, and the received TCP data packet or UDP data packet is directly discarded. If the port number included in the TCP data packet or the UDP data packet is included in the port reachability information list, it indicates that the TCP data packet or the UDP data packet can be processed. Because the Modem does not have a data processing capability of the AP, the AP is wakened. The TCP data packet or UDP data is sent to the AP, so that the AP performs further processing.

According to the data processing method provided in this embodiment of the present invention, processing can be performed on a Ping data packet, an IGMP data packet, a TCP data packet, or a UDP data packet. In a situation in which a modem can perform processing, an AP does not need to be wakened, which reduces a system resource and reduces power consumption of the system.

An embodiment of the present invention further provides a data processing method as a further description of the method shown in FIG. 1. Before the performing processing on the data packet according to the protocol in the TCP/IP protocol stack, the method includes:

receiving the preset processing rule sent by an AP, where the status data packet is a heartbeat data packet or a Push data packet; and the performing processing on the data packet according to the preset processing rule includes:

if the push Push data packet sent by the server is received, sending a response data packet to the server according to the Push data packet, where the response data packet is used for the server to learn that the mobile device is in an on-line state.

The Push data packet is used in a Push technology, where the Push technology is a technology that a network side server proactively sends information to a client. The Push data packet is a status data packet that is regularly sent by the network side server to a terminal. When receiving the Push data packet, a modem of the terminal replies to the Push data packet, and in this way, the network side server learns an on-line status of the terminal.

Optionally, the heartbeat data packet is sent to the server according to preset duration, where the heartbeat data packet is used to indicate that the mobile device is currently in the on-line state.

In daily use, instant messaging software and social software may run on the terminal. The software may regularly send a heartbeat data packet to the network side server, so that the server learns that a terminal user is in an on-line or off-line state. The preset duration may be 30 s, 60 s, and the like. In this case, the data packet sent by the network side server does not need to be received, and the Modem itself sends a heartbeat data packet to the server according to the preset duration, so that the network side server learns the on-line status of the terminal.

Further, in a process of sending data to the server, the method further includes:

if a network signal strength is less than a preset strength value, and resending failure information sent by the server is received, cancelling data packet sending within preset waiting duration.

The network signal strength is detected for preset detection duration. If the network signal strength is not less than the preset strength value, the data packet is sent to the server.

In the prior art, in a process of sending data to the server, if sending fails, resending is performed until the sending is successful. If a network signal is poor, resending is continuously performed, which leads to redundant sending by a Modem and wastes a network resource. In this embodiment of the present invention, when first sending fails, resending is performed once. If resending failure information sent by the network side server is received after the resending is performed, and a current network signal strength is low (a current network signal strength value is less than a preset strength value, for example, −90 dBm), data packet sending is cancelled within preset waiting duration (for example, three minutes). The network signal strength is detected for preset detection duration (for example 30 s). If the network signal strength is not less than the preset strength value, the data packet is sent to the server. If the network signal strength is less than the preset strength value, the network signal strength is detected for another preset detection duration (for example, 30 s), until the detected network signal strength is not less than the preset strength value.

According to the data processing method provided in this embodiment of the present invention, after resending fails once, it can be determined, according to a current network signal strength, whether a data packet continues to be sent, thereby reducing a waste of a network resource.

Figure 4:
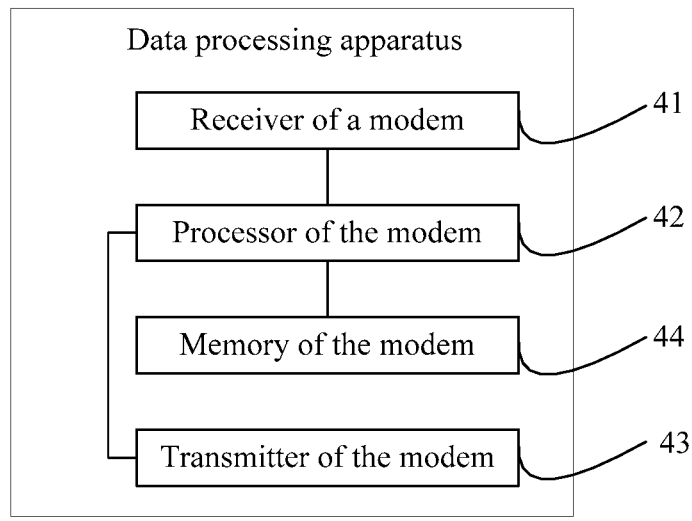
FIG. 4 is a schematic structural diagram of a data processing apparatus according to an embodiment of the present invention.

An embodiment of the present invention further provides a data processing apparatus, where the apparatus is located in a Modem, and the apparatus is configured to execute the method shown in FIG. 1 to FIG. 3. As shown in FIG. 4, the apparatus includes:

a receiver 41 of the modem, configured to receive a data packet sent by a server; and a processor 42 of the modem, configured to acquire a type of the data packet;

determine whether the type of the data packet received by the receiver 41 of the modem is consistent with a type of a data packet processed by using a preset processing rule or a type of a protocol in a preset TCP/IP protocol stack to obtain a determining result, where the preset TCP/IP protocol stack includes a transport layer protocol suite and/or a network layer protocol suite in a TCP/IP protocol family, and the data packet processed by using the preset processing rule is a status data packet, where the status data packet is used to indicate an on-line status of a terminal;

when the type of the data packet is consistent with the type of the data packet processed by using the preset processing rule, perform processing on the data packet according to the preset processing rule; and when the type of the data packet is consistent with the type of the protocol in the preset TCP/IP protocol stack, perform processing on the data packet according to the protocol in the preset TCP/IP protocol stack.

The preset processing rule and the preset TCP/IP protocol stack are stored in a memory 44 of the modem, and the processor 42 of the modem reads, from the memory 44 of the modem, the preset processing rule and the protocol in the preset TCP/IP protocol stack to perform processing on the data packet.

Further, the processor 42 of the modem is further configured to preset the network layer protocol suite, where the network layer protocol suite includes at least one of the following protocols: ICMP and IGMP; and/or preset the transport layer protocol suite, where the transport layer protocol suite includes at least one of the following protocols: TCP and UDP.

Further, that the processor 42 of the modem is configured to perform processing on the data packet according to the protocol in the TCP/IP protocol stack is specifically that:

the processor 42 of the modem is configured to: when the data packet is a Ping data packet, acquire a reachability status of a device queried by using the Ping data packet, where the apparatus further includes a transmitter 43 of the modem, configured to send the reachability status of the device to the server.

Further, that the processor 42 of the modem is configured to perform processing on the data packet according to the protocol in the TCP/IP protocol stack is specifically that:

the processor 42 of the modem is configured to: when the data packet is an IGMP data packet, if an AP is already in a sleep state, discard the IGMP data packet.

Further, the receiver 41 of the modem is further configured to receive a port reachability information list sent by the AP, where the port reachability information list includes at least one port number, and the port number is an identification number of an activated port; and that the processor 42 of the modem is configured to perform processing on the data packet according to the protocol in the TCP/IP protocol stack is specifically that:

the processor 42 of the modem is configured to: when the data packet is a TCP data packet or a UDP data packet, if a port number included in the TCP data packet or the UDP data packet is not included in the port reachability information list, discard the TCP data packet or UDP data.

Further, the receiver 41 of the modem further includes: receiving the preset processing rule sent by the AP, where the status data packet is a heartbeat data packet or a Push data packet; and that the processor 42 of the modem is configured to perform processing on the data packet according to the preset processing rule is specifically that:

the processor 42 of the modem is configured to: when the receiver 41 of the modem receives the push Push data packet sent by the server, control, according to the Push data packet, a transmitter 43 of the modem to send a response data packet to the server, where the response data packet is used for the server to learn that the mobile device is in an on-line state.

Optionally, the processor 42 of the modem is further configured to control a transmitter 43 of the modem to send a heartbeat data packet to the server according to preset duration, where the heartbeat data packet is used to indicate that a mobile device is currently in an on-line state.

Further, the processor 42 of the modem is further configured to: when a network signal strength is less than a preset strength value, and the receiver 41 of the modem receives resending failure information sent by the server, control the transmitter 43 of the modem to cancel data packet sending within preset waiting duration.

Figure 5:
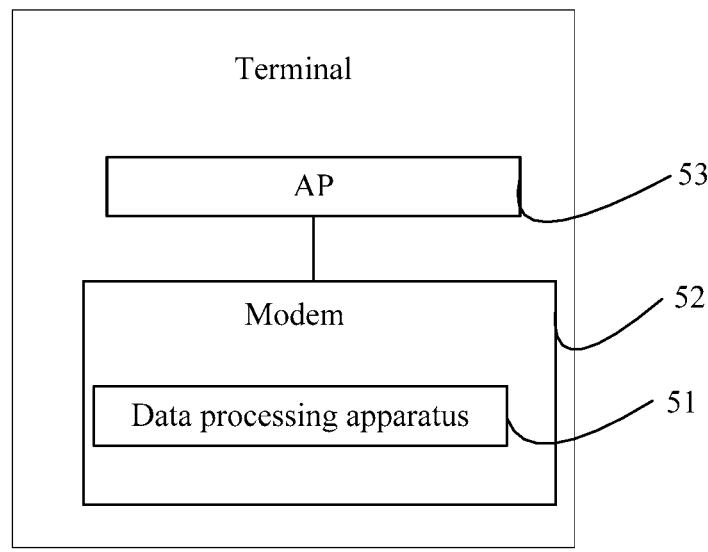
FIG. 5 is a schematic structural diagram of a terminal including an data processing apparatus according to an embodiment of the present invention.

It should be noted that, as shown in FIG. 5, a data processing apparatus 51 provided in an embodiment of the present invention is located in a Modem 52, and a terminal includes an AP 53 and the Modem 52 connected to the AP 53. The Modem 52 communicates with a server by using a wireless network or a wired network.

The inventor detects energy consumption for one minute when the terminal receives a Ping data packet. When the data processing apparatus provided in this embodiment of the present invention is not used, as shown in FIG. 6-*a*, a last row shows a current, including a current jointly lost by a Modem and an AP, output by a power supply of the terminal in a process in which the terminal outputs a constant voltage. As shown in FIG. 6-*a*, a minimum current output by the power supply is 2.512 mA, a maximum current output by the power supply is 513.794 mA, and an average current output by the power supply is 53.145 mA. When the data processing apparatus provided in this embodiment of the present invention is used, as shown in FIG. 6-*b*, a last row shows that in a running process of the terminal, a minimum current output by the power supply is 1.484 mA, a maximum current output by the power supply is 267.451 mA, and an average current output by the power supply is 43.321 mA. Because there is a proportional relationship between power consumption and a current, when the current decreases, power decreases accordingly. By comparing the average current 53.145 mA in FIG. 6-*a* with the average current 43.321 mA in FIG. 6-*b*, it can be concluded that, the data processing apparatus provided in this embodiment of the present invention can reduce energy consumption by (53.145-43.321)/53.145=0.185, that is, 18.5%. In FIG. 6-*b*, because processing in the AP is transferred to and performed by the Modem, a situation of a high current in FIG. 6-*a* does not exist in FIG. 6-*b*, thereby reducing energy consumption.

It may be clearly understood by persons skilled in the art that, for the purpose of convenient and brief description, only the division of the foregoing functional modules is described by using an example, and in an actual application, the foregoing functions may be accomplished by different functional modules according to a requirement, that is, the inner structure of the apparatus is divided into different functional modules to accomplish all or some of the functions described above. For a detailed working process of the foregoing system, apparatus, and unit, reference may be made to a corresponding process in the foregoing method embodiments, and details are not described herein again.

The foregoing descriptions are merely specific implementation manners of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope of the claims.

What is claimed is:

1. A data processing method for a modem, comprising:
   receiving a data packet from a server, and acquiring a type of the data packet;
   determining whether the type of the data packet is consistent with a type of a data packet processed using a preset processing rule or a type of a protocol in a preset TCP/IP protocol stack, wherein the preset TCP/IP protocol stack comprises a transport layer protocol suite and/or a network layer protocol suite in a TCP/IP protocol family, and wherein the data packet processed using the preset processing rule is a status data packet, wherein the status data packet is used to indicate an on-line status of a terminal; and
   performing processing on the data packet according to the preset processing rule or according to the protocol in the preset TCP/IP protocol stack based on whether the type of the data packet is consistent with the type of the data packet processed using the preset processing rule or whether the type of the data packet is consistent with the type of the protocol in the preset TCP/IP protocol stack;

wherein: the network layer protocol suite comprises at least one of the following protocols: Internet Control Message Protocol (ICMP) and Internet Group Management Protocol (IGMP); and/or the transport layer protocol suite comprises at least one of the following protocols: Transmission Control Protocol (TCP) and User Datagram Protocol (UDP);

wherein the data packet is a TCP data packet or a UDP data packet;

wherein before performing processing on the data packet according to the protocol in the preset TCP/IP protocol stack, the method further comprises: receiving a port reachability information list from an application processor, wherein the port reachability information list comprises at least one port number, and the at least one port number comprises an identification number of an activated port; and wherein performing processing on the data packet according to the protocol in the TCP/IP protocol stack comprises: if a port number comprised in the TCP data packet or the UDP data packet is not comprised in the port reachability information list, discarding the TCP data packet or UDP data packet.

2. The method according to claim 1, wherein before performing processing on the data packet according to the preset processing rule, the method further comprises: receiving the preset processing rule from the application processor, wherein the status data packet comprises a Push data packet; and wherein performing processing on the data packet according to the preset processing rule comprises: if the Push data packet from the server is received, sending a response data packet to the server according to the Push data packet, wherein the response data packet enables the server to determine that the terminal is in an on-line state.

3. The method according to claim 1, wherein the method further comprises:

if a network signal strength is less than a preset strength value, and the received data packet is resending failure information from the server, cancelling data packet sending within a preset waiting duration.

4. A modem for data processing, comprising:

a receiver, configured to receive a data packet from a server; and a processor, configured to:
  acquire a type of the data packet;
  determine whether the type of the data packet received by the receiver is consistent with a type of a data packet processed using a preset processing rule or a type of a protocol in a preset TCP/IP protocol stack, wherein the preset TCP/IP protocol stack comprises a transport layer protocol suite and/or a network layer protocol suite in a TCP/IP protocol family, and wherein the data packet processed using the preset processing rule is a status data packet, wherein the status data packet is used to indicate an on-line status of a terminal;
  perform processing on the data packet according to the preset processing rule or according to the protocol in the preset TCP/IP protocol stack based on whether the type of the data packet is consistent with the type of the data packet processed using the preset processing rule or whether the type of the data packet is consistent with the type of the protocol in the preset TCP/IP protocol stack;

wherein: the network layer protocol suite comprises at least one of the following protocols: Internet Control Message Protocol (ICMP) and Internet Group Management Protocol (IGMP); and/or the transport layer protocol suite comprises at least one of the following protocols: Transmission Control Protocol (TCP) and User Datagram Protocol (UDP);

wherein the receiver is further configured to receive a port reachability information list sent by an application processor, wherein the port reachability information list comprises at least one port number, and the at least one port number comprises an identification number of an activated port; and wherein the processor is further configured to: when the data packet is a TCP data packet or a UDP data packet, if a port number comprised in the TCP data packet or the UDP data packet is not comprised in the port reachability information list, discard the TCP data packet or UDP data.

5. The modem according to claim 4, wherein the processor is further configured to: when the data packet is a Ping data packet, acquire a reachability status of a device queried using the Ping data packet; and wherein the modem further comprises:
a transmitter, configured to send the reachability status of the device to the server.

6. The modem according to claim 4, wherein the processor is further configured to: when the data packet is an IGMP data packet, if an application processor (AP) is already in a sleep state, discard the IGMP data packet.

7. The modem according to claim 4, wherein the receiver is further configured to receive the preset processing rule from the application processor, wherein the status data packet comprises a Push data packet; and wherein the processor is further configured to: when the receiver receives the Push data packet from the server, control, according to the Push data packet, a transmitter of the modem to send a response data packet to the server, wherein the response data packet enables the server to determine that the terminal is in an on-line state.

8. The modem according to claim 4, wherein the processor is further configured to: when a network signal strength is less than a preset strength value, and the receiver receives resending failure information from the server, control a transmitter of the modem to cancel data packet sending within a preset waiting duration.

9. A modem for data processing, comprising:

a receiver, configured to receive a data packet from a server; and a processor, configured to:
  acquire a type of the data packet;
  determine whether the type of the data packet received by the receiver is consistent with a type of a data packet processed using a preset processing rule or a type of a protocol in a preset TCP/IP protocol stack, wherein the preset TCP/IP protocol stack comprises a transport layer protocol suite and/or a network layer protocol suite in a TCP/IP protocol family, and wherein the data packet processed using the preset processing rule is a status data packet, wherein the status data packet is used to indicate an on-line status of a terminal;
  perform processing on the data packet according to the preset processing rule or according to the protocol in the preset TCP/IP protocol stack based on whether the type of the data packet is consistent with the type of the data packet processed using the preset processing rule or whether the type of the data packet is consistent with the type of the protocol in the preset TCP/IP protocol stack;

wherein: the network layer protocol suite comprises at least one of the following protocols: Internet Control Message Protocol (ICMP) and Internet Group Management Protocol (IGMP); and/or the transport layer protocol suite comprises at least one of the following protocols: Transmission Control Protocol (TCP) and User Datagram Protocol (UDP); and wherein the processor is further configured to: when a network signal strength is less than a preset strength value, and the receiver receives resending failure information from the server, control a transmitter of the modem to cancel data packet sending within a preset waiting duration.

\* \* \* \* \*